May 2, 1967 F. I. DULLY 3,317,248
WHEEL COVER
Filed June 28, 1965

INVENTOR.
Floyd I. Dully
BY
Herbert Furman
ATTORNEY 3,317,248
WHEEL COVER
Floyd I. Dully, Detroit, Mich., assignor to General Motors Corporation, Detroit, Mich., a corporation of Delaware
Filed June 28, 1965, Ser. No. 467,621
6 Claims. (Cl. 301—37)

This invention relates to wheel covers and more particularly to a wheel cover having improved means to self-retainingly mount the cover on a vehicle wheel.

One feature of this invention is that it provides an improved wheel cover. Another feature of this invention is that it provides an improved wheel cover having cover retaining means cooperable with both the wheel rim and the wheel body for retaining the cover on the wheel. A further feature of this invention is that the wheel rim and wheel body are provided with radially spaced shoulders cooperable with radially spaced shoulders on the cover retaining means. Yet another feature of this invention is that the cover retaining shoulders are normally radially spaced apart a lesser distance than the wheel shoulders and means are provided to resiliently thrust the cover shoulders against the wheel shoulders.

These and other features of the cover of this invention will be readily apparent from the following specification and drawings wherein.

Figure 1:
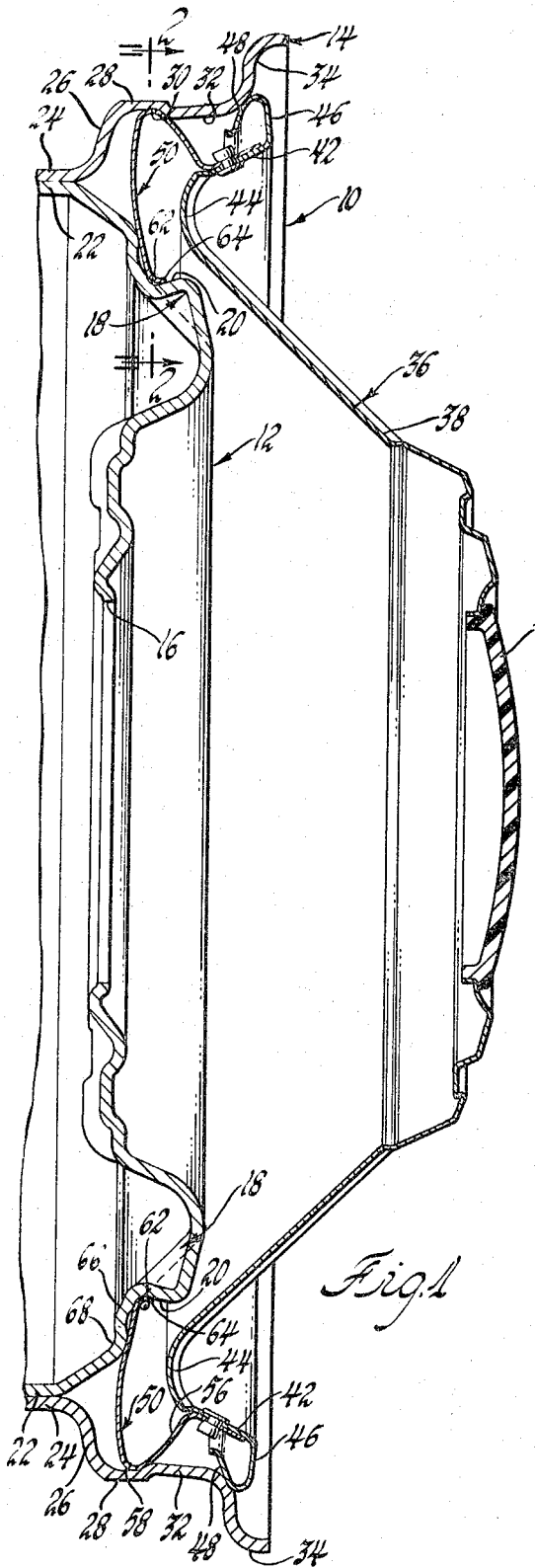
FIGURE 1 is a sectional view of a portion of a vehicle wheel having a wheel cover according to this invention mounted thereon.
Figure 2:
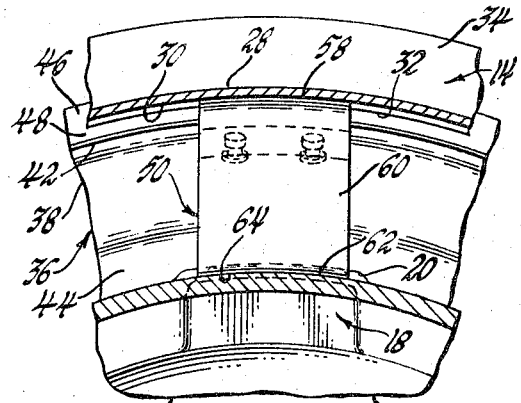
FIGURE 2 is a view taken generally along the plane indicated by line 2—2 of FIGURE 1.

Referring now particularly to FIGURE 1 of the drawings, a conventional vehicle wheel designated generally 10 includes a wheel body 12 and a wheel rim 14. As is conventional, the body 12 is of annular shape and includes a central opening 16 for receiving the axle, not shown, of the vehicle, with the wheel being bolted thereto at a number of locations radially outwardly of the opening 16. The body 12 further includes a plurality of conventional retaining bumps or shoulder structures 18 which thrust or extend axially and radially outwardly therefrom. Each of the structures 18 includes a radially outwardly and axially inwardly facing shoulder 20. The outer peripheral flange 22 of the wheel body is provided with a number of circumferentially spaced arcuate cutouts, as is conventional, and is welded or otherwise secured intermediate these cutouts to the base flange 24 of the whel rim. While the cutouts are not shown, they result from the manner in which the wheel body is formed and provide air circulation through the wheel. The wheel rim further includes an axially and radially outwardly extending flange portion 26 which merges into what is commonly known as a safety bead 28, the inner surface of which provides a circumferential shoulder 30 which is located generally radially outwardly of the bumps or shoulder structures 18 in confronting relationship thereto. The bead 28 joins the flange portion 26 to an intermediate flange portion 32 of the rim which merges into the axially outer terminal flange portion 34 of the rim.

A wheel cover 36 is provided to close the opening of the wheel 10 and conceal the wheel body and the major portion of the wheel rim 14. The cover 36 includes a cover body 38 provided with a central medallion 40. The cover body 38 includes a radially and axially outwardly extending flange portion 42 which merges at its inner edge portion with an axially outwardly opening channel shaped portion 44 of the cover body. At its outer edge portion, the flange portion 42 merges with an axially and radially inwardly opening, channel-shaped, peripheral flange portion 46 of the cover body. When the cover is mounted on the wheel as shown in FIGURE 1, the axially inner leg 48 of portion 46 engages the juncture shoulder between flange portions 32 and 34 to axially space the cover 36 with respect to the wheel.

A plurality of circumferentially spaced cover retaining means or clips 50 are provided to self-retainingly mount the cover 36 on the wheel 10. In the specific embodiment shown, three such clips are provided although it will be understood that more or less may be provided if desired. Each clip 50 includes a radially outer flange portion or leg 54 which is riveted to the flange portion 42 of the cover body. A flange portion or leg 56 extends radially outwardly and axially inwardly of the cover body at an obtuse angle to flange portion 54 and merges on an arcuate radially outwardly facing juncture shoulder or bight portion 58 with a radially and axially inwardly extending flange portion or leg 60. The leg 60 merges on a juncture shoulder 62 with a terminal flange portion or leg 64. It will be noted that the shoulders 58 and 62 are normally spaced apart a lesser radial distance than the shoulders 20 and 30. Preferably the clips 50 are made of spring steel.

Figure 3:
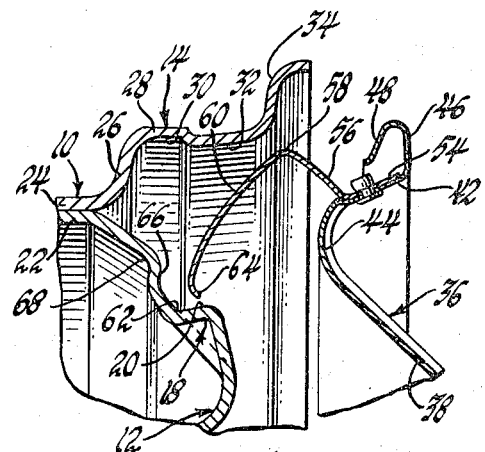
FIGURE 3 is a view of a portion of a wheel showing the cover as it is being mounted thereon.
Figure 4:
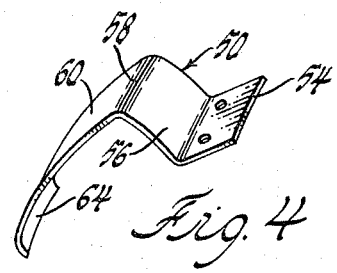
FIGURE 4 is a perspective view of one of the cover retaining means.

Normally each clip 50 extends generally axially and radially inwardly of the cover 36 when the cover is not mounted on the wheel, as shown in FIGURE 3. When it is desired to mount the cover on the wheel, the cover is generally aligned with the opening of the wheel, as defined by the intermediate flange portion 32, and is thereafter moved axially inwardly of the wheel. The juncture shoulders 62 will initially engage a generally radially inwardly and axially outwardly sloping flange portion 66 of the wheel body as the shoulders 58 of the clips move within the flange portion 32 in spaced relationship thereto. Upon continued inward movement of the cover, the shoulders 62 move or slide radially inwardly along flange portion 66 as the legs 60 of the clips start to swing axially outwardly with respect to the legs 56 and the shoulders 58 thereupon start to move radially outwardly with respect to the shoulders 62. This movement continues until the sharp free edges of legs 64 engage shoulders 20 whereupon the shoulders 58 move into engagement with the shoulder 30 of the wheel rim so that the shoulders 62 and 58 thrust against the wheel shoulders 20 and 30 and the legs 60 are located at an acute angle with respect to the legs 56. It will be noted that when the legs 60 and 56 are so located, the leg 48 of portion 46 engages the shoulder between flange portions 32 and 34 to axially locate the cover 36 on the wheel.

It will be noted that the wheel body is provided with an annular shoulder 68 which is located radially outwardly of the flange portion 66 and engages an intermediate portion of the legs 60 of the clips to slightly bow the clips axially outwardly and increase the thrusting relationship between the shoulders 58 and 62 and the wheel shoulders.

If desired, the legs 64 may be provided with a serrated or similar type edge portion to increase the gripping relationship between these edges and the shoulder 20. It will also be noted that the shoulders 58 and 62 and the legs 64 are shaped so as to conform to the curvature of the shoulders 20 and 30.

If it is desired to remove the cover 36, a screw driver or other similar pry-off tool is inserted between the leg 48 of flange portion 46 and the adjacent shoulder of the wheel rim and the cover is pried axially outwardly of the wheel. When the shoulders 58 of the clips move out of engagement with the shoulders 30 and slightly axially outwardly along the flange portion 32, the radial spacing between the shoulders 58 and 62 is less than that between the shoulders 30 and 20 and the cover can be easily removed from the wheel.

Thus, this invention provides an improved wheel cover.

I claim:

1. In a wheel structure including a wheel rim and a wheel body provided with radially facing circumferentially extending retaining shoulders, a cover for said wheel structure including a cover body and cover retaining means having radially spaced shoulders thereof engaging said rim and body shoulders, said cover shoulders being normally axially spaced relative to each other and radially spaced relative to each other a lesser distance than said wheel body and wheel rim shoulders, and means decreasing the relative axial spacing of said cover shoulders to move said cover shoulders radially outwardly of each other into thrusting relationship with said wheel body and wheel rim shoulders.

2. In a wheel structure including a wheel rim and a wheel body provided with radially facing circumferentially extending retaining shoulders, a cover for said wheel structure including a cover body and cover retaining means having radially spaced shoulders thereof engaging said rim and body shoulders, said cover shoulders being normally located in axially spaced relationship to each other and being radially spaced apart a lesser distance than said wheel body and said wheel rim shoulders, and means decreasing the relative axial spacing of said cover shoulders to move said cover shoulders axially with respect to each other into a generally aligned radially outwardly spaced relationship to locate said cover shoulders in thrusting relationship with said wheel body and said wheel rim shoulders.

3. In a wheel structure including a wheel rim and a wheel body provided with radially spaced circumferentially extending retaining shoulders, a cover for said wheel structure including a cover body and at least one cover retaining clip, said clip including a pair of angularly disposed legs joined across a juncture shoulder, one of said legs being secured to said cover body, the other of said legs being provided with a shoulder adjacent the free edge portion thereof spaced radially and axially of said juncture shoulder, said clip shoulders being normally spaced apart a lesser distance than said wheel body and said wheel rim shoulders, said legs being movable relative to each other to decrease the angularity therebetween and decrease the axial spacing between said shoulders to move said shoulders generally radially outwardly of each other into thrusting relationship with said wheel structure shoulders.

4. The wheel structure recited in claim 3 wherein said legs are normally at an obtuse angle and are movable relative to each other so as to be disposed at an acute angle when said cover is mounted on said wheel structure.

5. The structure recited in claim 3 wherein said other of said legs is movable relative to said one leg about said juncture shoulder to move said shoulder of said other leg axially and radially relative to said juncture shoulder.

6. The structure recited in claim 3 wherein said other leg is normally disposed radially and axially inwardly of said one leg and is movable axially outwardly of said one leg to move said shoulder thereof radially inwardly with respect to said juncture shoulder.

References Cited by the Examiner

UNITED STATES PATENTS

| | | | |
|---|---|---|---|
| 2,881,026 | 4/1959 | Lyon | 301—37 |
| 2,967,736 | 1/1961 | Lyon | 301—37 |
| 3,022,868 | 2/1962 | Lyon | 301—37 X |

MILTON BUCHLER, *Primary Examiner.*

RICHARD J. JOHNSON, *Examiner.*